United States Patent [19]

Clerc

[11] Patent Number: 5,150,737
[45] Date of Patent: Sep. 29, 1992

[54] CERAMIC DISCS FOR TAPS AND TAPS EQUIPPED WITH SUCH DISCS

[75] Inventor: Daniel Clerc, Le Perreux, France
[73] Assignee: C.I.C.E. S.A., France
[21] Appl. No.: 528,292
[22] Filed: May 24, 1990

[30] Foreign Application Priority Data

Jun. 22, 1989 [FR] France .................. 89 08313

[51] Int. Cl.$^5$ .......................... F16K 3/08; F16K 3/32
[52] U.S. Cl. ........................... 137/625.3; 137/625.31;
251/208; 251/368
[58] Field of Search .................. 251/208, 368;
137/625.31, 625.3

[56] References Cited

U.S. PATENT DOCUMENTS

| | | | |
|---|---|---|---|
| 1,238,433 | 8/1917 | Pedersen | 251/208 |
| 4,360,040 | 11/1982 | Cove et al. | 251/208 X |
| 4,946,134 | 8/1990 | Orlandi | 251/208 |

FOREIGN PATENT DOCUMENTS 1109472 6/1961 Fed. Rep. of Germany .

Primary Examiner—Arnold Rosenthal
Attorney, Agent, or Firm—Remy J. VanOphem

[57] ABSTRACT

In a "half-turn" type two-disc tap, the two discs are superposed and in contact to adjust the flow rate of a liquid. Each disc has first and second openings situated on respective sides of a predetermined diameter of the disc. The first opening is situated in the central part of the disc and the second opening is situated at the periphery of the disc so that in the closed position of the tap is openings of each disc are separated from the openings of the other disc and in the maximum open position of the tap the first and second openings are respectively and conjointly superposed over an angle just less than 360°.

20 Claims, 2 Drawing Sheets

CERAMIC DISCS FOR TAPS AND TAPS EQUIPPED WITH SUCH DISCS

BACKGROUND OF THE INVENTION

1. Field of the Invention

The invention relates to improvements in devices known as half-turn taps and in particular to the ceramic discs used to manufacture such devices.

2. Description of the Prior Art

Taps are devices designed to regulate the flow of a liquid, usually water. Their main functions are to completely shut off the flow of liquid and to progressively establish the flow of the liquid, that is to say to regulate the flow from a minimum, shut-off position to a maximum "wide open" position.

Numerous devices have been developed with this aim. They can be classified into two main families, "mobile valve" taps and "ceramic disc" taps.

In "mobile valve" taps sealing is achieved by applying a rubber washer to a rigid fixed seat whose shape it matches. In this case the flow rate is regulated by progressively moving the washer away from the seat by means of a spindle so as to increase the fluid flow cross-section.

There are many disadvantages related to the design of this type of tap. For a given position of the operating spindle the flow rate varies with temperature; insufficient sensibility of the flow rate adjustment; risk of defective sealing due to premature aging of the rubber washer; and imprecision of the closed position.

"Ceramic disc" tape overcome some of the aforementioned disadvantages of "mobile valve" taps and are generally of a design which uses two discs made from alumina or other ceramic materials.

Each disc has one or more openings and an extremely flat surface (maximum shape defect is two interference fringes—helium emission ray, i.e. 0.589 um) that is highly polished (roughness coefficient Ra 0.25 um or less).

Depending on the type of "ceramic disc" tap, the openings may be similar in both discs or different. Each occupies a disc sector.

One disc is fixed, the other rotates. They are superposed with their flat surfaces is contact.

The flatness of these ceramic discs and their smoothness are sufficient for the contact between their surfaces to provide the necessary sealing.

One disc, usually the fixed disc, is connected at its unpolished rear surface to the end of the liquid feed line through the intermediary of a seal which provides the static sealing of the tap.

The other, mobile disc is rotated by a spindle coupled to a handle.

Angular displacement of the mobile disc relative to the fixed disc progressively superposes the openings to create one or more passages whose cross-section regulates the flow of liquid from a null value up to the maximum flow rate.

Numerous patents describe such taps, for example: EP-0.055.181, EP-0.296.945 and DE-2.805.038.

In most taps described or available on the market each disc has one or more openings, the geometry of which is defined by one or two straight line segments parallel to diameters of the disc and one or two circular arcs concentric with the periphery of the disc.

Depending on the type of tap, the fixed disc and the mobile disc may be identical or different with regard to the number and shape of the openings.

Discs with two openings generally have identical openings in the fixed disc and the mobile disc, quarter-circle shape and diametrally opposite each other.

The maximum opening of a tap fitted with these discs is obtained by 90° rotation of the mobile disc relative to the fixed disc. For this reason this type of tap is called a "quarter-turn" tap.

Other discs with a single opening have different openings on each of the two (fixed and mobile) discs. Usually (see, for example, the aforementioned document EP-0.296.945) the fixed disc has a comma-shape opening on an angle more than 180° but less than 270° and the mobile disc has an opening subtending an angle just less than 90°. The maximum opening of the tap equipped with these discs is obtained by around 270° rotation of the mobile disc relative to the fixed disc. For this reason this type of tap is called a "three-quarter-turn" tap.

These three types of "ceramic disc" tap have advantages over their valve-type counterparts. Nevertheless, they have certain disadvantages such as non-linearity of the flow rate for the "quarter-turn" and "half-turn" types; imprecise adjustment on opening and closing the flow of liquid for the "quarter-turn" and "half-turn" taps; high noise associated with some operating positions of the "quarter-turn" and "half-turn" taps; insufficient flow rate in the case of the "three-quarter-turn" tap; a general lack of balance in the "half-turn" and "three-quarter-turn" taps due to the asymmetry of the flow of the liquid relative to the axis of the discs; serious water hammer effects for the "quarter-turn" and "half-turn" taps; and the fully open position is difficult to achieve in a single movement with the "three-quarter-turn" tap.

The invention is directed to alleviating the aforementioned disadvantages by improving linearity of the flow of the liquid on opening and closing as compared with "half-turn" and "quarter-turn" taps; reducing the lack of balance in "half-turn" and "three-quarter-turn" taps; and increasing flow rate in "three-quarter-turn" taps.

SUMMARY OF THE INVENTION

In invention relates to discs for "half-turn" type liquid taps wherein the taps include a hollow body containing between a liquid inlet and outlet two ceramic discs with their plane surfaces in contact.

In practice one of the discs is fixed and on the liquid inlet side and the other is mobile. The latter is rotated by a spindle coupled to a handle.

The invention is based on the principle of simultaneous flow of a liquid through two diametrally opposed openings in each of two identical, usually ceramic discs.

When the tap is fully open the liquid flows through two passages obtained by the superposition of the openings in the two discs over an angle slightly less than 360°.

The linearity of the increase in the flow rate is related to the regular increase in the surface area of the apertures as the tap is rotated to an angle just less than 180°.

The object of the invention is, therefore, a disc for a half-turn type two-disc tap wherein the two discs are superposed and in contact to adjust the flow rate of a liquid. First and second openings are provided and are situated on respective sides of a predetermined diameter of the disc. The first opening is situated in the central part of the disc and the second opening is situated at the periphery of the disc so that in the closed position of the tap the openings of each are not superposed and in the maximum open position of the tap the first and second openings are respectively superposed.

In other words, in each disc the symmetrical area of each opening relative to the diameter does not intersect the other opening.

According to preferred features, some of which may be combined with others, the first opening is half-moon shaped and is inscribed within a sector of less than 180° and the second opening is in the shape of part of a ring concentric with the disc and is inscribed within a sector subtending an angle slightly less than 180°.

The first and second openings are delimited by circular arcs and/or straight lines and the intersections of these circular arcs and/or these straight lines are rounded; the radius with which the intersections are founded in the first opening is less than the diameter of the circular arc delimiting the first opening, divided by 24 and the radius with which the intersections are rounded in the second opening is less than the difference between the diameters of the circular arc delimiting the second opening, divided by 24.

According to a further feature of the invention, the first and second openings are delimited by circular arcs and straight lines, with the second opening being delimited circumferentially by radially extending edges of the second opening near the predetermined diameter. Closing is effected firstly by the absence of overlap of the first openings and secondly by the absence of overlap of the second openings whereby the start or end of superposition of the second openings defines a liquid passage whose shape is similar to a trapezium.

According to yet a further feature of the invention, the first opening has the shape of a half-moon delimited by a straight line segment near the predetermined diameter and a circular arc and the second opening has the shape of a part-ring concentric with the disc delimited circumferentially by radially extending edges. The angle α between the diameter of the disc and one of the radially extending edges of the second opening is less than the angle β between the diameter and a radius passing through the intersection between the straight line segment and the circular arc delimiting the first opening. The first and second openings have parts which widen towards the surfaces of the disc which are not in contact, and the discs are made of ceramic.

Other objects of the invention are a back-to-back pair of discs and a tap using discs as defined above.

The invention will be better understood and other advantages will emerge from the following description given by way of non-limiting example taken in conjunction with the appended drawings.

DETAILED DESCRIPTION OF THE PREFERRED EMBODIMENT

Figure 1:
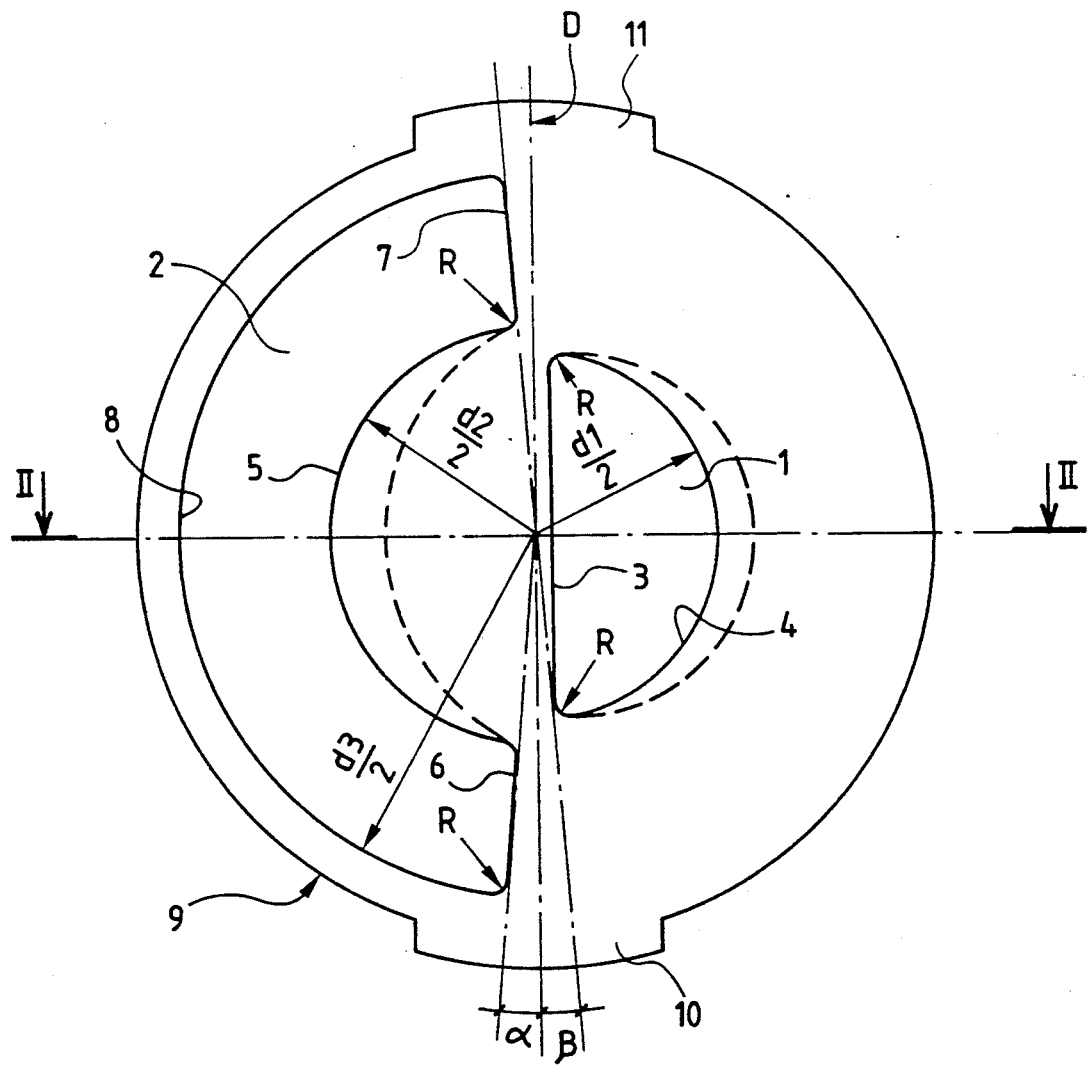
FIG. 1 is a top view of a disc in accordance with the invention.
Figure 2:
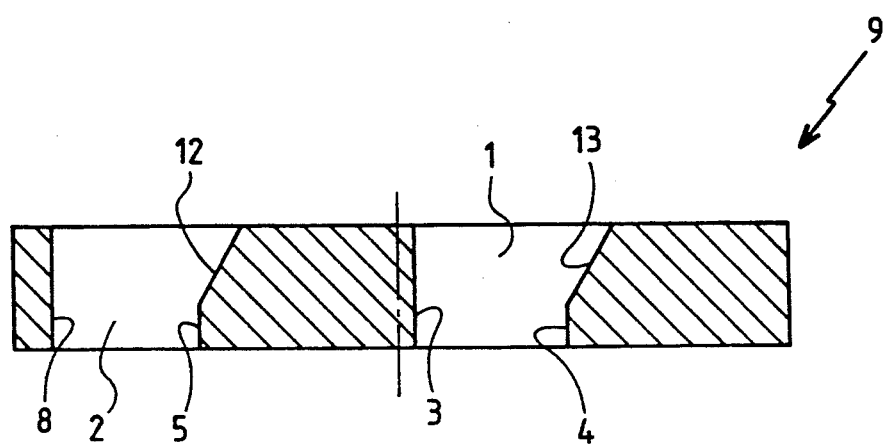
FIG. 2 is a view of the disc shown in FIG. 1 in an axial cross-section taken on the line II—II thereof.

FIGS. 1 and 2 show a disc in accordance with the invention which has particularly advantageous openings.

The invention concerns a "half-turn" type tap including two ceramic, usually alumina discs 9 and 9'. The two discs are identical.

In the case of known prior art "half-turn" taps, each disc has an opening defined by a straight line parallel to and near a diameter and by a circular arc concentric with the disc. As a result, when the tap is closed the residual passage for the liquid due to the superposition of the openings is in the shape of a triangle, the apex of which moves quickly away from the center of the discs which prevents a linear relationship of the flow rate to the angle of rotation of the operating spindle.

When the tap is open, the passage for the liquid due to the superposition of the openings lies within a sector subtending an angle less than 180°. This creates a pressure imbalance in the tap and, therefore, premature wear and noisy flow of the liquid.

The discs according to the present invention include two different openings each subtending an angle just less than 180°. These openings are concentric with the disc and are disposed at diametrally opposite locations and extend circumferentially over two sectors together subtending an angle less than 360°.

In other words, according to the present invention, the discs have two openings 1 and 2 together extending over a sector subtending an angle just less than 360° to implement a "half-turn" tap, the openings having appropriate shapes enabling a progressive linear increase in the flow rate as the tap is opened.

Figure 3:
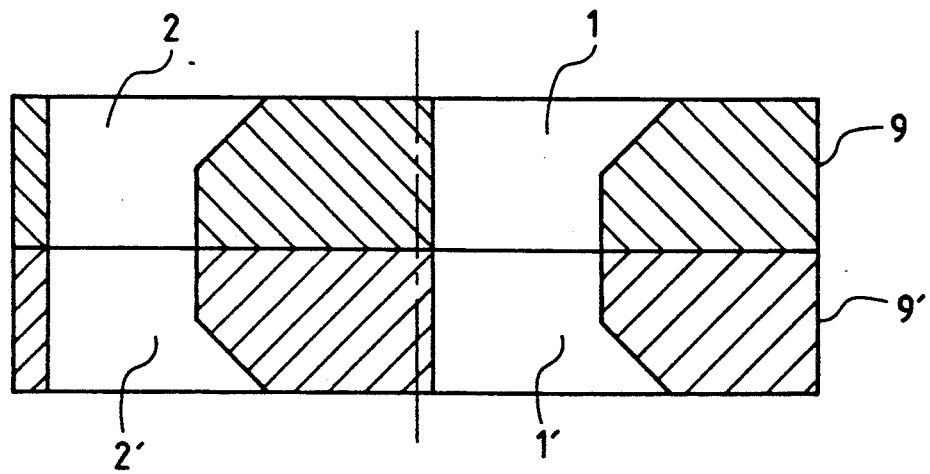
FIG. 3 shows the superposition of the two discs in accordance with the invention in a fully open tap.

As can be seen from FIGS. 1 and 3, each disc has two openings 1 and 2 and 1' and 2', respectively, situated on respective sides of a main diameter D. The first opening 1 and 1' is delimited by a straight line segment 3 parallel to and near D and by a circular arc 4 concentric with the disc and a diameter d1. It is half-moon shaped.

The second opening 2 and 2' is on the opposite side of the diameter D to the first opening. It is delimited by a circular arc 5 concentric with the disc and has a diameter d2 such that d2 > d1, two radially extending edges 6 and 7 of the second opening near the diameter D and as far apart in the circumferential direction as possible from each other but such that the angle formed by these two radially extending edges 6 and 7 of the second opening is just less than 180°, and a second circular arc concentric with the disc and of diameter d3 such that d3 > d2 and d3 is as large as possible in comparison with the outside diameter of the disc generally denoted 9. The lines 3 and 4 on the one hand and 5, 6, 7 and 8 on the other hand may have sharp intersections or intersections with radii R which are not necessarily all the same.

Note that, generally speaking, the symmetrical area of each opening relative to the reference diameter D does not intersect the other opening.

At maximum flow rate the two discs 9 and 9' are placed so as to superpose totally the opening 1 and 2 and 1' and 2' of each respective disc; the liquid flows to both sides of the diameter D and the tap is well balanced.

As the discs are rotated relative to each other the residual passages remain disposed to either side of the diameter D and maintain the balance of the tap.

The openings are designed so that closure is effected first by absence of overlap of the first or central openings 1 and 1' and then by absence of overlap of the second or peripheral openings 2 and 2'. On closing, the fact that the openings 2 and 2' are delimited in part by the radially extending edges 6 and 7 of the second opening means that the residual water flow shape is practically trapezoidal. The trapezoidal shape of the passages whose height is constant and equal to $(d3-d2)/2$ enables virtually linear variation of their cross-section as a function of the angle of rotation of the discs relative to each other.

In FIG. 1, $\alpha$ is the small angle between the diameter D and the radially extending edges of the second opening. $\beta$ is the small angle between the diameter D and a radius passing through the intersection of the straight line carrying the straight line segment 3 and the circular arc 4. These small angles $\alpha$ and $\beta$ are symmetrically repeated on the opposite side of the disc.

Linearity of the flow rate variation on opening and closing is obtained if $\alpha < \beta$.

The influence of the radii R is small if they are small in relation to the dimensions of the openings as follows: $R < d1/24$ for the opening 1 and 1', and $R < (d3-d2)/24$ for the second opening 2 and 2'.

The disc may be provided with portions such as 10 and 11, illustrated as projecting radially, to prevent them from warping and for rotating them by means of an appropriate part or for immobilizing them relative to the body of the tap as is generally the case for one of the two discs.

Flared surfaces 12 and 13, radii or chamfers may be provided to improve the flow of fluid upstream and downstream of the area of contact between the two discs. These passages, therefore, widen in the direction away from the surfaces in contact.

FIG. 3 shows the superposition of two discs in accordance with the invention in a fully open tap. This figure shows that the identical openings are in corresponding relationship and enable the liquid to flow to each side of the diameter D.

Figure 4:
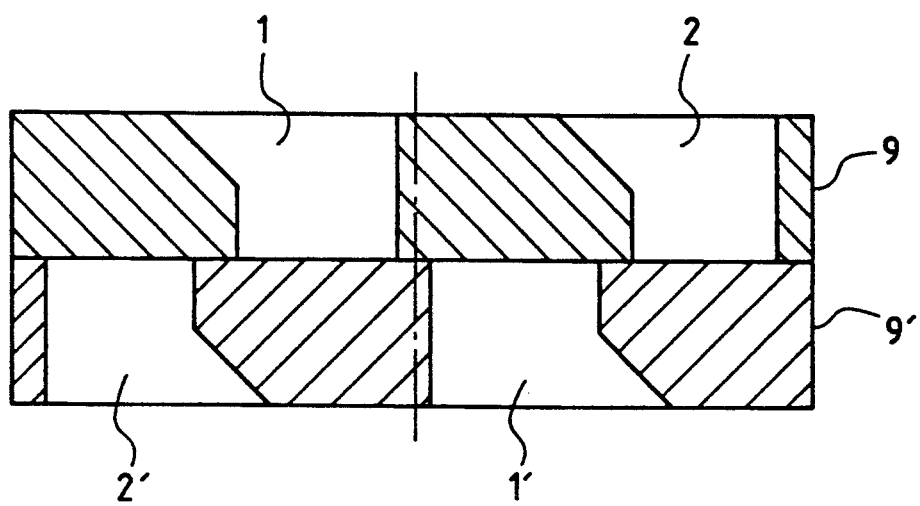
FIG. 4 shows the superposition of the two discs in accordance with the invention in a fully closed tap.

FIG. 4 shows the superposition of two discs in accordance with the invention in a fully closed tap. This figure shows each opening overlapped by a solid part of the opposite disc, effecting total closure of the liquid passage.

It is within the scope of the present invention to vary the surface of the openings 1 and 1' and 2 and 2' by modifying the diameters d1, d2 and d3 according to the conditions of use and the required result so as to increase the surface area of one opening at the expense of the other. The mounting of the discs in accordance with the invention in the tap is conventional in itself and will be obvious to those skilled in the art.

What is claimed is:

1. A half-turn type liquid tap comprising two superimposed discs in contact capable of rotation relative to each other about a common central axis to adjust the flow rate of a liquid, each disc of said two superimposed discs comprising first and second apertures, said first and second apertures being situated on opposite sides of a radial diametral distance from said common central axis of each said two discs and on opposite sides of a diametrical axis of each said two discs, said first aperture being in the central part of each said two disc and said second aperture being in the peripheral part of each said two discs so that in a closed position of said tap said first and second apertures in one of said two superimposed discs are angularly displaced approximately 180 degrees from said first and second apertures, respectively, in the other of said two superimposed discs and in a fully open position of said tap said first and second apertures of said two superimposed discs are respectively superposed.

2. A tap according to claim 1 wherein said first aperture has a half-moon shape.

3. A tap according to claim 1 wherein said second aperture has a shape of a part-ring concentric with each said two discs.

4. A tap according to claim 2 wherein said second aperture has a shape of a part-ring concentric with each said two discs.

5. A tap according to claim 1 wherein said first aperture has a shape of a half-moon delimited by a straight line segment near a diametrical axis and a circular arc and said second aperture has a shape of a part-ring concentric with each said two discs delimited circumferentially by radially extending edges, and angle between said diametrical axis and said radially extending edges of said second aperture being less than an angle between said diametrical axis and an intersection of said straight line segment and said circular arc delimiting said first aperture.

6. Discs for a half-turn type two-disc tap in which the two discs are superimposed and in contact with each other, said two discs having a common central axis and being rotatable relative to each other about said central axis to adjust a flow rate of a liquid flowing through said two-disc tap, each disc of said two discs comprising:
   a diametrical axis;
   a first aperture located in said disc on a radially inward side of a predetermined radial diametral distance from said central axis of said disc, said first aperture further being located on one side of said diametrical axis, said first aperture extending in said disc along a first predetermined radial sector;
   first closure means located in said disc on said radially inward side diametrically opposite said first aperture;
   a second aperture located in said disc on a radially outward side of said predetermined radial diametral distance from said central axis, said second aperture further being located on an opposite side of said diametrical axis, said second aperture extending in said disc along a second predetermined radial sector; and
   second closure means located in said disc on said radially outward side diametrically opposite said second aperture;
   wherein said two discs of said two-disc tap are superimposed in a closed position when said first aperture on said one side of said diametrical axis of each of said two discs is aligned with said first closure means on said radially inward side on said opposite side of said diametrical axis of each of said two discs while said second aperture on said opposite side of said diametrical axis of each of said two discs is aligned with said second closure means on said radially outward side on said one side of said diametrical axis of each of said two discs and when superimposed in a maximum open position, said first and second apertures of one of said two discs are substantially aligned, respectively, with said first and second apertures of the other of said two discs.

7. Discs according to claim 6 wherein said first opening has a half-moon shape.

8. Discs according to claim 6 wherein said first predetermined radial sector is less than 180°.

9. Discs according to claim 6 wherein said second aperture is in the shape of part of a ring concentric with each said disc.

10. Discs according to claim 9 wherein said part-ring is inscribed within a sector having an included angle slightly less than 180°.

11. Discs according to claim 6 wherein said first and second apertures are delimited by circular arcs and straight lines having rounded intersections.

12. Discs according to claim 11 wherein the radius of said rounded intersections of said first aperture is less than the diameter of said circular arc delimiting said first aperture, divided by 24.

13. Discs according to claim 11 wherein said second aperture is delimited by a pair of concentric circular arcs, wherein the radius of said rounded intersections of said second aperture is less than the difference between the diameters of said pair of concentric circular arcs, divided by 24.

14. Discs according to claim 6 wherein said first and second apertures are delimited by circular arcs and straight liens, said second aperture being delimited circumferentially near said predetermined radial diametral distance.

15. Discs according to claim 6 wherein closing of said two-disc tap is effected by an absence of said first apertures being superimposed and by an absence of said second apertures being superimposed.

16. Discs according to claim 14 wherein the start or end of superposition of said second apertures defines a liquid passage whose shape is similar to a trapezium.

17. Discs according to claim 6 wherein said first aperture has the shape of a half-moon delimited by a straight line segment near a center of said predetermined radial diametral distance and a circular arc and said second aperture has the shape of a part-ring concentric with the disc delimited circumferentially at each end by a radially extending edge, and wherein said two-disc tap further comprises an angle between said diametrical axis of said disc and said radially extending edge of said second aperture, said angle being less than an angle between said diametrical axis and the intersection between said straight line segment and said circular arc delimiting said first aperture.

18. Discs according to claim 6 wherein said first and second apertures widen towards the surface of each said two discs which are not in contact.

19. Discs according to claim 6 wherein said two discs are ceramic discs.

20. Discs according to claim 7 wherein said second aperture is in the shape of a part-ring concentric with each said two discs.

* * * * *

UNITED STATES PATENT AND TRADEMARK OFFICE
CERTIFICATE OF CORRECTION

PATENT NO. : 5,150,737

DATED : September 29, 1992

INVENTOR(S) : Daniel Clerc

It is certified that error appears in the above-identified patent and that said Letters Patent is hereby corrected as shown below:

Column 1, line 33, delete "tape" and insert ---- taps ----.

Column 1, line 42, delete "is" and insert ---- in ----.

Column 2, line 22, delete "tap" and insert ---- taps ----.

Column 2, line 46, delete "In" and insert ---- The ----.

Column 3, line 3, after "each" insert ---- disc ----.

Column 3, line 20, delete "founded" and insert ---- rounded ----.

Column 3, line 58, delete "an".

Column 5, line 22, after "the" insert ---- first ----.

Column 5, line 63, delete "disc" and insert ---- discs ----.

Column 6, line 18, delete "and" and insert ---- an ----.

Column 6, line 67, delete "open-" and insert ---- aperture ----.

Column 6, line 67, delete "ing".

Column 7, line 24, delete "liens" and insert ---- lines ----.

UNITED STATES PATENT AND TRADEMARK OFFICE
CERTIFICATE OF CORRECTION

PATENT NO. : 5,150,737

DATED : September 29, 1992

INVENTOR(S) : Daniel Clerc

It is certified that error appears in the above-identified patent and that said Letters Patent is hereby corrected as shown below:

Column 8, line 20, delete "surface" and insert ---- surfaces ----.

Signed and Sealed this

Ninth Day of November, 1993

Attest:

BRUCE LEHMAN

*Attesting Officer*   *Commissioner of Patents and Trademarks*